United States Patent [19]

Smith

[11] Patent Number: 5,191,797
[45] Date of Patent: Mar. 9, 1993

[54] MINIATURE ELECTRONIC PRESSURE GAUGE

[75] Inventor: Rowland C. Smith, Wimborne, United Kingdom

[73] Assignee: ITW Limited, Windsor, United Kingdom

[21] Appl. No.: 775,196

[22] Filed: Oct. 11, 1991

[51] Int. Cl.⁵ .............................................. G01L 9/00
[52] U.S. Cl. ........................................ 73/714; 73/753; 73/756; 116/34 R
[58] Field of Search ................ 73/714, 756, 754, 753, 73/DIG. 4; 116/34 R; 239/163, 164, 126, 170, 302, 337

[56] References Cited

U.S. PATENT DOCUMENTS

| 4,250,759 | 2/1981 | Vago et al. | 73/723 |
| 4,301,685 | 11/1981 | Guillemont | 73/723 |
| 4,352,168 | 9/1982 | Anderson | 368/10 |
| 4,615,211 | 10/1986 | Kolm et al. | 73/146.2 |
| 5,005,765 | 4/1991 | Kistner | 239/135 |
| 5,044,557 | 9/1991 | Smith | 239/302 |

FOREIGN PATENT DOCUMENTS

| 1429716 | 3/1976 | United Kingdom . |
| 2081902 | 2/1982 | United Kingdom . |
| 2043318 | 10/1982 | United Kingdom . |
| 2102959 | 2/1983 | United Kingdom . |
| 2127557 | 4/1984 | United Kingdom . |

Primary Examiner—Donald O. Woodiel
Attorney, Agent, or Firm—MacMillan, Sobanski & Todd

[57] ABSTRACT

A miniature electronic pressure gauge is described comprising a case (10) having an aperture leading to a transducer (1) connected to an amplifier (3), the transducer (1) and amplifier (3) being powered from a power source (2) in the form of a storage battery such as a Nicod battery. A pressure signal from the amplifier (3) is fed to a linearization circuit (4) and to an analogue/digital converter (6) clocked with pulses from clock generator (5). The output of converter (6) is fed to a decoder/driver (7) for a seven segment L.C.D. (8). In a preferred construction the pressure gauge is releasably retained in a fluid-tight engagement in a bore in the wall of a pressure chamber of a paint spray gun.

2 Claims, 4 Drawing Sheets

MINIATURE ELECTRONIC PRESSURE GAUGE

This invention relates to a miniature preferably digital electronic pressure gauge.

More particularly, the invention provides pressure transducer means in a sealed enclosure having its own power source, said enclosure being retained by releasable retaining means in fluid-tight engagement in a cavity in a wall of a pressure chamber, said cavity leading to the interior of the chamber.

The transducer as aforesaid may be fitted to a paint spray gun, and is removably fastened by means of a screw or bayonet fitting.

Various embodiments of the invention will now be described, by way of example only, with reference to the accompanying drawings, in which.

Figure 1:
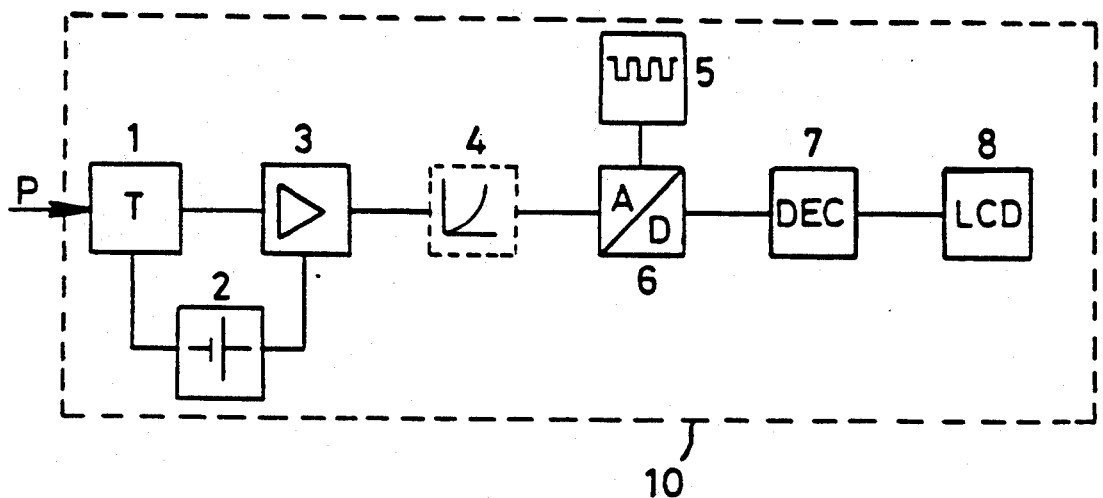
FIG. 1 is a block diagram of a miniature digital electronic pressure gauge according to the invention providing for display of the measured pressure.
Figure 2:
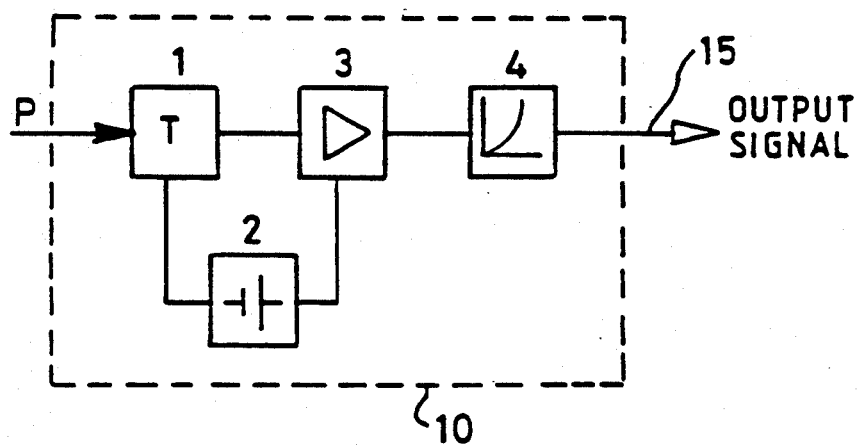
FIG. 2 is a block diagram of a second form of the pressure gauge providing an output signal for further processing.

In FIG. 1 a miniature digital electronic pressure gauge comprises a case 10 having an aperture leading to a transducer 1 connected to an amplifier 3, the transducer 1 and amplifier 3 being powered from a power source 2 in the form of a small storage battery. A pressure signal from the amplifier 3 is fed (if necessary) to a linearisation circuit 4 and thence to an analogue/digital converter 6 clocked with pulses from clock generator 5. The output of converter 6 is fed to decoder/driver 7 for a seven-segment display 8 of the liquid crystal type. The casing 10 is made of high grade stainless steel and is sealed against the ingress of liquid or gaseous fluids under pressure. By this means the unit is intrinsically safe for use in hazardous areas. The power source 2 is a nicad battery such as is now common in calculators and watches. On the exhaustion of the cell 2, the unit may be discarded to be replaced with a new sealed unit. The unit is desirably accurate to within 2% and can read from from 0 to 400 PSI; it is important that it should always read 0 under nil applied pressure The unit of FIG. 2 is similar to that of FIG. 1 except that an output signal 15 is taken from the linearisation circuit 4.

Figure 3:
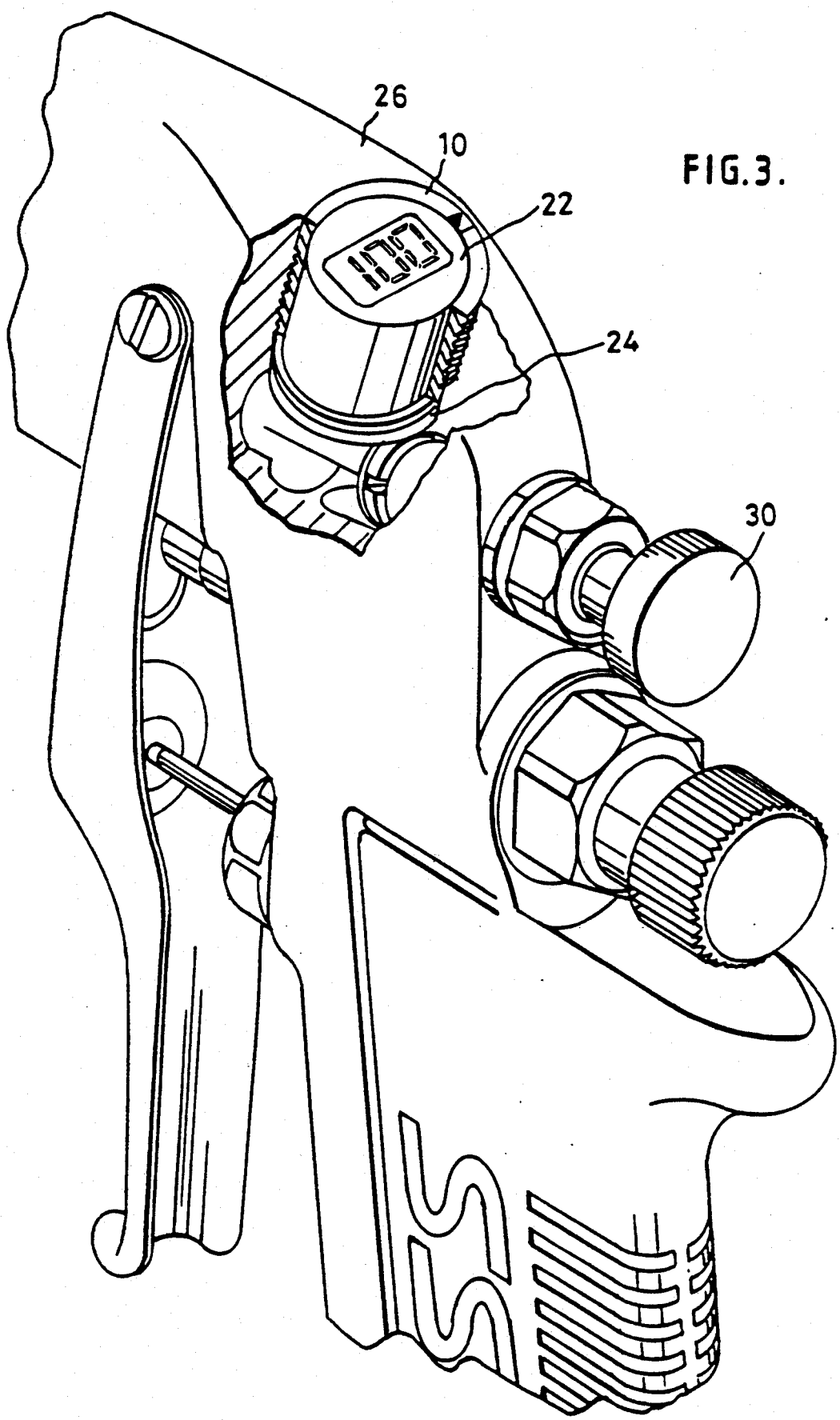
FIGS. 3 to 5 are respectively a fragmentary perspective view of a spray gun having a pressure gauge according to the invention fitted thereto, a sectional view of the gun showing the path taken therethrough by compressed air, and a detail section showing how the gauge is retained in the gun body.
Figure 4:
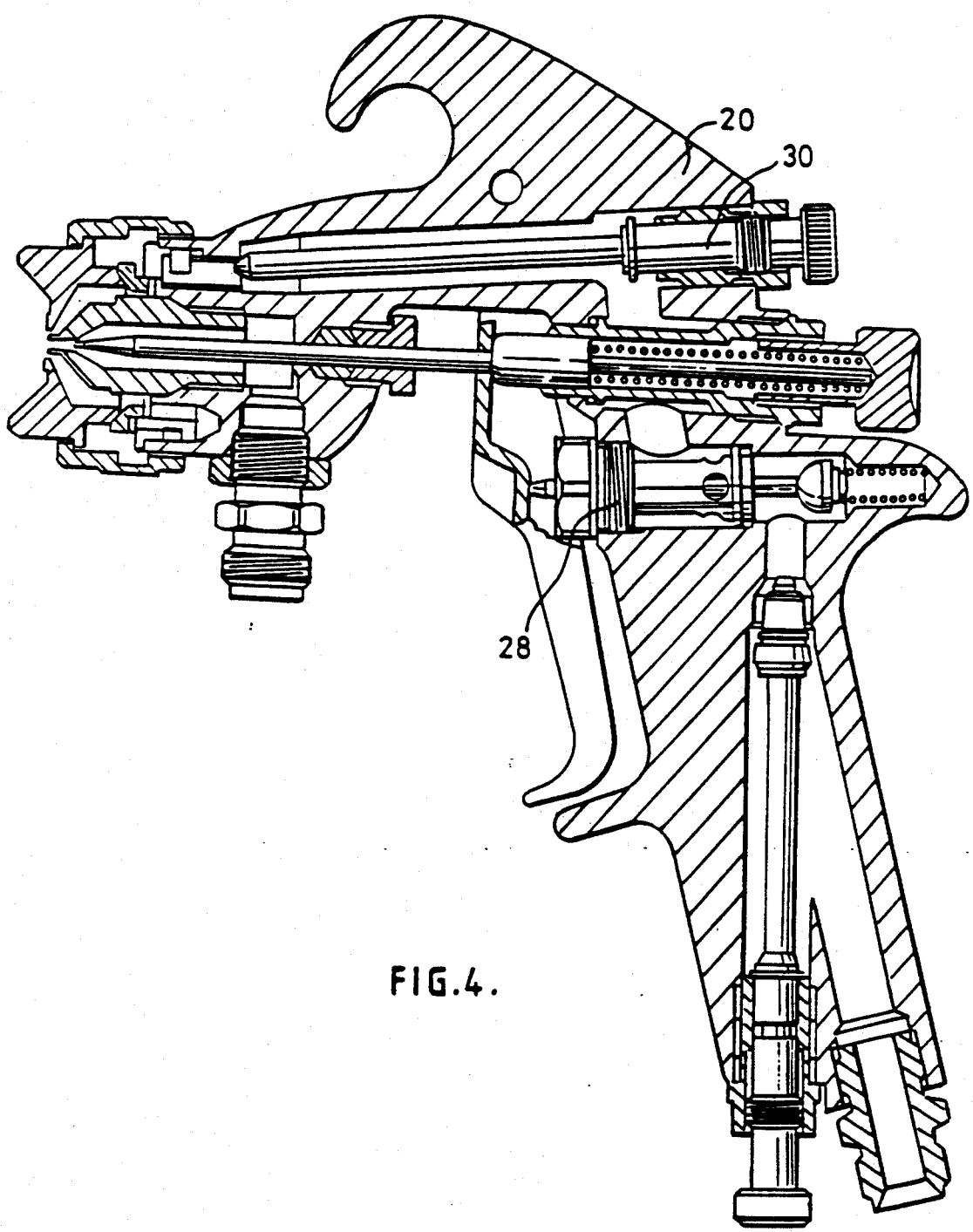
Figure 5:
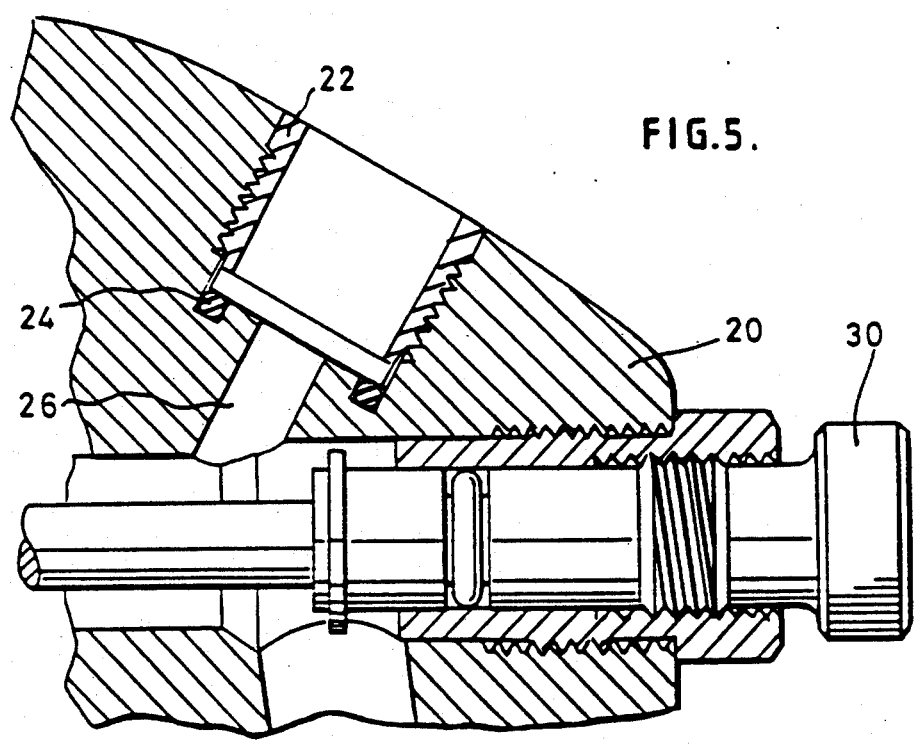

In FIGS. 3 to 5 the unit of FIG. 1 is shown fitted to a manually operated paint spray gun. A threaded aperture in a casing 20 of the gun accepts a retaining bush 22 in which the pressure gauge unit is fitted. The bush 22 seats on an O-ring 24 in the body 20, and a bore 26 leads from a region of the air path downstream of the trigger 28 and adjacent the spreader control valve 30 to the aperture in the casing 10.

Figure 6:
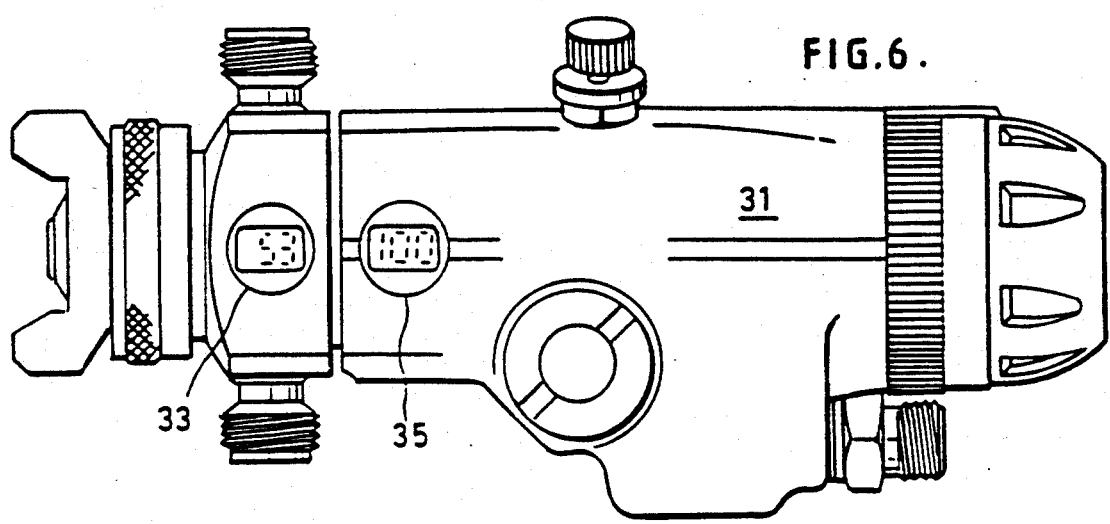
FIG. 6 is a side view of a second form of a spray gun.

In FIG. 6 there is shown a paint spraygun for automatic operation having a body 31 fitted with pressure transducers 33, 35 in the fluid and air supply paths.

It will be appreciated that transducers of similar structure may be fitted to compressors, air regulators, fluid regulators, tire pressure gauges and control panels.

I claim:

1. A paint spray gun including a body defining an interior space through which air under pressure can be passed, a bore defined in said body leading from said interior space, pressure gauge means for indicating the air pressure in said interior space, means releasably retaining said pressure gauge means in said bore, and wherein said pressure gauge means includes a pressure transducer, a power source connected to supply power to said transducer, digital pressure display means for indicating air pressure sensed by said pressure transducer, and a sealed housing enclosing said pressure transducer, said power source and said display means.

2. A paint spray gun, as set forth in claim 1, wherein said bore has a threaded portion and wherein said retaining means includes a threaded retainer which engages said threaded bore portion, and further including means for sealing said housing to said bore.

* * * * *